United States Patent
Chang

(10) Patent No.: US 7,599,019 B2
(45) Date of Patent: Oct. 6, 2009

(54) BACKLIGHT MODULE WITH ELASTIC CONNECTOR CLIPS FIXING LIGHT SOURCE AND LIQUID CRYSTAL DISPLAY HAVING SAME

(75) Inventor: Cheng-Fang Chang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 232 days.

(21) Appl. No.: 11/500,529

(22) Filed: Aug. 8, 2006

(65) Prior Publication Data

US 2007/0030701 A1 Feb. 8, 2007

(30) Foreign Application Priority Data

Aug. 8, 2005 (TW) .............................. 94126751 A

(51) Int. Cl.
*G02F 1/1333* (2006.01)
(52) U.S. Cl. .......................................... 349/60; 349/65
(58) Field of Classification Search ................... 349/60, 349/65
See application file for complete search history.

(56) References Cited

U.S. PATENT DOCUMENTS

| 6,347,882 | B1 | 2/2002 | Vrudny et al. |
| 6,969,188 | B2 | 11/2005 | Kuo |
| 7,212,258 | B2 * | 5/2007 | Jang et al. ..................... 349/69 |
| 7,348,269 | B2 * | 3/2008 | Tanaka et al. ............... 438/613 |

* cited by examiner

*Primary Examiner*—Jerry T Rahll
(74) *Attorney, Agent, or Firm*—Wei Te Chung

(57) ABSTRACT

An exemplary backlight module (200) includes a frame (210), a light guide plate (230) disposed in the frame, and a light source (220) adjacent to the light guide plate. The frame includes a pair of elastic electrically conductive connector clips (280) opposite to each other. The elastic connector clips cooperatively fix the light source in the frame and are configured for electrically connecting the light source to an external power supply. Because the backlight module includes the pair of elastic connector clips to fix the light source, if the light source needs be renewed, it can be conveniently taken out from the backlight module directly. Thus, the risk of accidental damage to damage of the optical elements of the backlight module during this process is minimal.

15 Claims, 4 Drawing Sheets

BACKLIGHT MODULE WITH ELASTIC CONNECTOR CLIPS FIXING LIGHT SOURCE AND LIQUID CRYSTAL DISPLAY HAVING SAME

FIELD OF THE INVENTION

The present invention relates to backlight modules typically used in liquid crystal displays (LCDs), and particularly to a backlight module having a pair of elastic connector clips that fix a light source therein.

GENERAL BACKGROUND

A typical liquid crystal display is capable of displaying a clear and sharp image through millions of pixels that make up the complete image. The liquid crystal display has thus been applied to various electronic equipment in which messages or pictures need to be displayed, such as mobile phones and notebook computers. However, liquid crystals in the liquid crystal display do not themselves emit light. Rather, the liquid crystals have to be lit up by a light source so as to clearly and sharply display text and images. The light source may be ambient light, or a backlight module attached to the liquid crystal display.

Referring to FIG. 6, a typical liquid crystal display 1 generally includes a backlight module 10 and a liquid crystal panel 20. The backlight module 10 includes a flexible printed circuit board (FPC) 11, a frame 13, four light sources 15, a light guide plate 17, a first brightness enhancement film (BEF) 12, a second BEF 14, a diffusing plate 18, and a reflective plate 16. The liquid crystal panel 20, the first BEF 12, the second BEF 14, the diffusing film 18, the light guide plate 17 and the reflective plate 16 are stacked one on the other in that order from top to bottom. The light sources 15 are welded on the FPC 11, and are located adjacent to a side of the light guide plate 17. The FPC 11 is used to electrically connect the light sources 15 with one or more external devices, such as a power supply.

However, because the light sources 15 are welded on the FPC 11, if the light sources 15 are damaged and need be renewed, it is necessary to disassemble the liquid crystal display 1 and renew the FPC 11 having the light sources 15 welded thereon. During disassembling of the liquid crystal display 1, the optical elements of the backlight module 10 and the liquid crystal panel 20 are liable to be accidentally damaged.

Therefore, a new backlight module and a liquid crystal display that can overcome the above-described problems are desired.

SUMMARY

In a preferred embodiment, a backlight module includes a frame, a light guide plate disposed in the frame, and a light source adjacent to the light guide plate. The frame includes a pair of elastic electrically conductive connector clips opposite to each other. The elastic connector clips cooperatively fix the light source in the frame and are configured for electrically connecting the light source to an external power supply.

Other advantages and novel features will become more apparent from the following detailed description when taken in conjunction with the accompanying drawings.

DETAILED DESCRIPTION OF PREFERRED EMBODIMENTS

Figure 1:
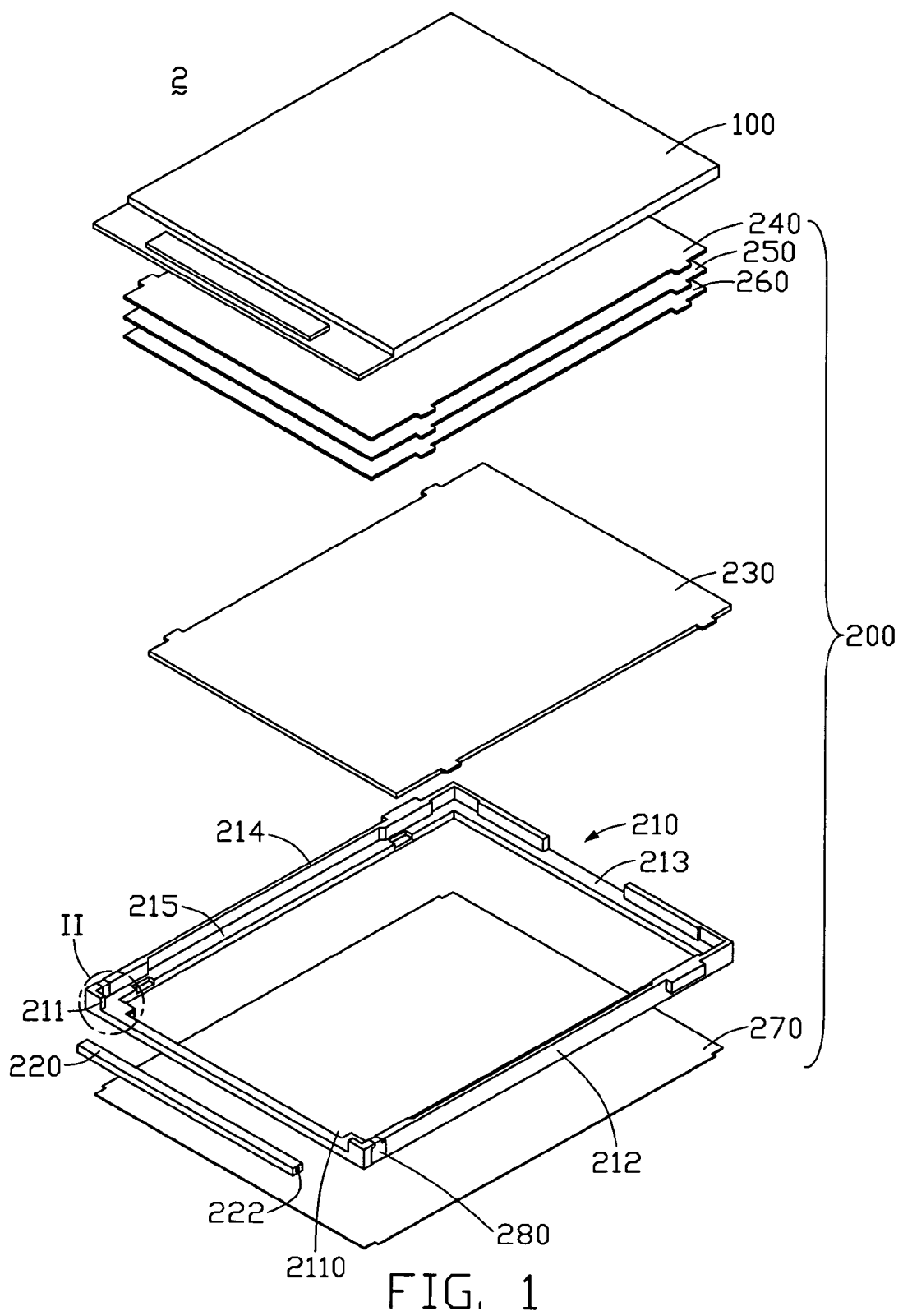
FIG. 1 is an exploded, isometric view of a liquid crystal display according to an exemplary embodiment of the present invention, the liquid crystal display including a light source, and a frame having a pair of elastic connector clips.

Referring to FIG. 1, a liquid crystal display 2 according to an exemplary embodiment of the present invention includes a liquid crystal panel 100, and a backlight module 200 for illuminating the liquid crystal panel 100. The backlight module 200 includes a frame 210, a light source 220, a light guide plate 230, a first BEF 240, a second BEF 250, a diffusing film 260, a reflective plate 270, and a pair of elastic electrically conductive connector clips 280. The liquid crystal panel 100, the first BEF 240, the second BEF 250, the diffusing film 260, the light guide plate 230, and the reflective plate 270 are stacked one on the other in that order from top to bottom. The light source 220 is located adjacent to an end edge of the light guide plate 230. The elastic connector clips 280 are substantially embedded in the frame 210.

The light source 220 includes three light emitting diodes (LEDs) sealed in a long rod which is made from transparent resin material, and a pair of metal sheets 222 respectively located at opposite ends of the rod. The metal sheets 222 are electrically connected with the light emitting diodes. The metal sheets 222 may be made from copper.

The frame 210 is plastic, and is typically made by an injection molding method. The frame 210 includes a four-sided supporting portion 215, and a first sidewall 211, a second sidewall 212, a third sidewall 213, and a fourth sidewall 214 all connecting end to end to cooperatively form a continuous peripheral upper wall. The four sidewalls 211, 212, 213, 214 and the supporting portion 215 cooperatively define an accommodating space therebetween. The supporting portion 215 includes an inner cutout 2110 generally adjacent to the first sidewall 211. The cutout 2110 accommodates the light source 220. The elastic connector clips 280 are respectively provided at the second and fourth sidewalls 212, 214. The elastic connector clips 280 are generally made from metal, such as copper. The elastic connector clips 280 are substantially embedded in the frame 210 during the process of injection molding the frame 210.

Figure 2:
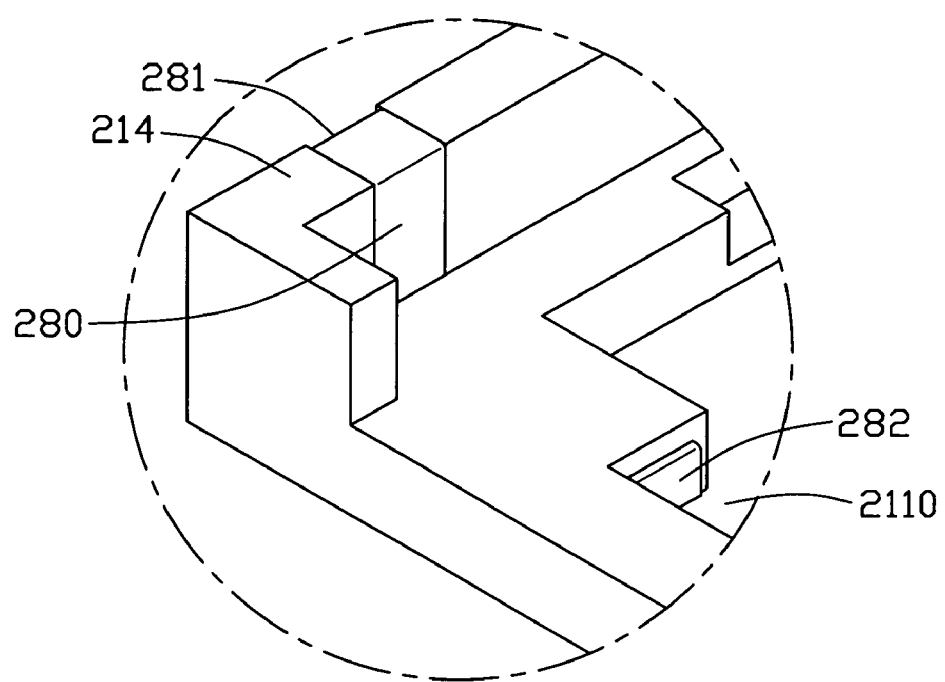
FIG. 2 is an enlarged view of a circled portion II of FIG. 1.
Figure 3:
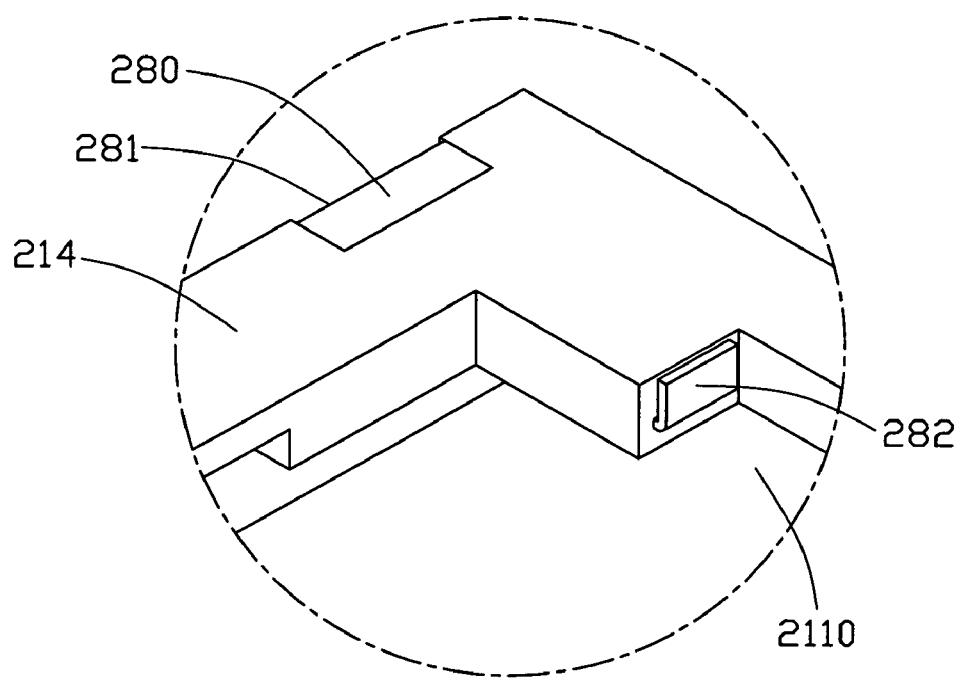
FIG. 3 is an inverted view of what is shown in FIG. 2.
Figure 4:
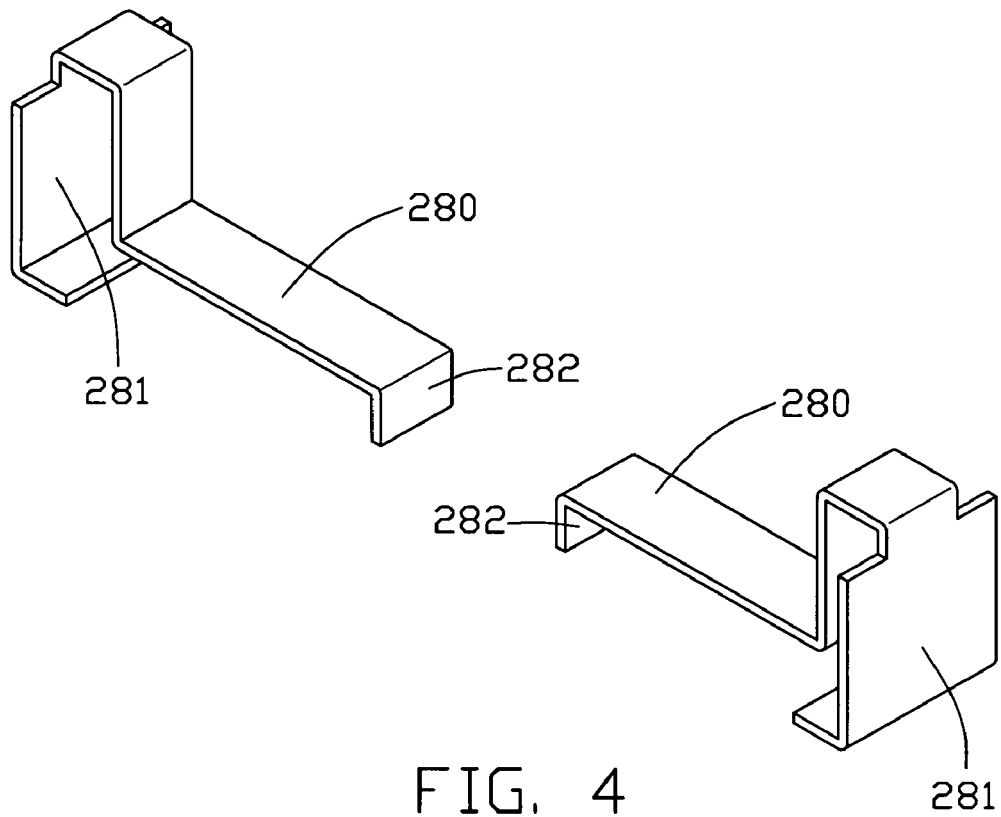
FIG. 4 is an enlarged view of the pair of elastic connector clips of the liquid crystal display of FIG. 1.
Figure 5:
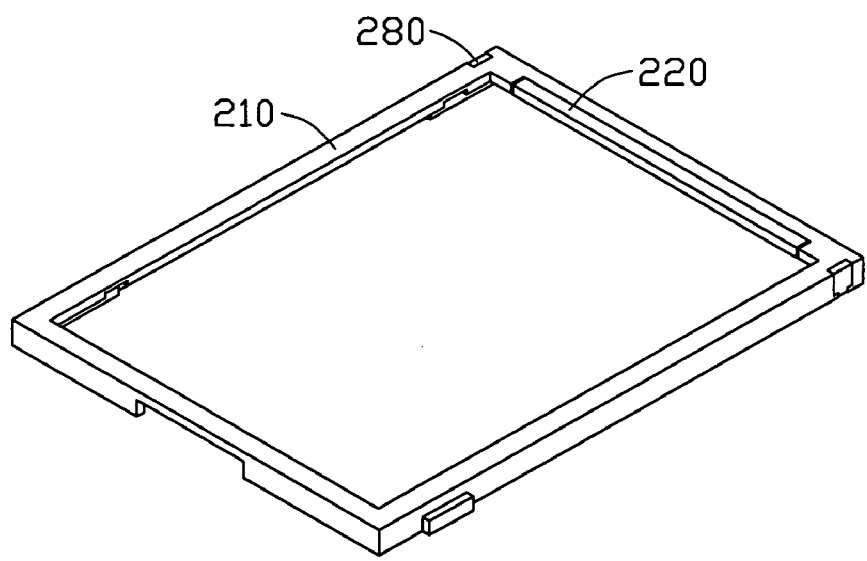
FIG. 5 is an inverted view of the frame with the pair of elastic connector clips and the light source of the liquid crystal display of FIG. 1, showing the light source attached to the frame by the elastic connector clips.
Figure 6:
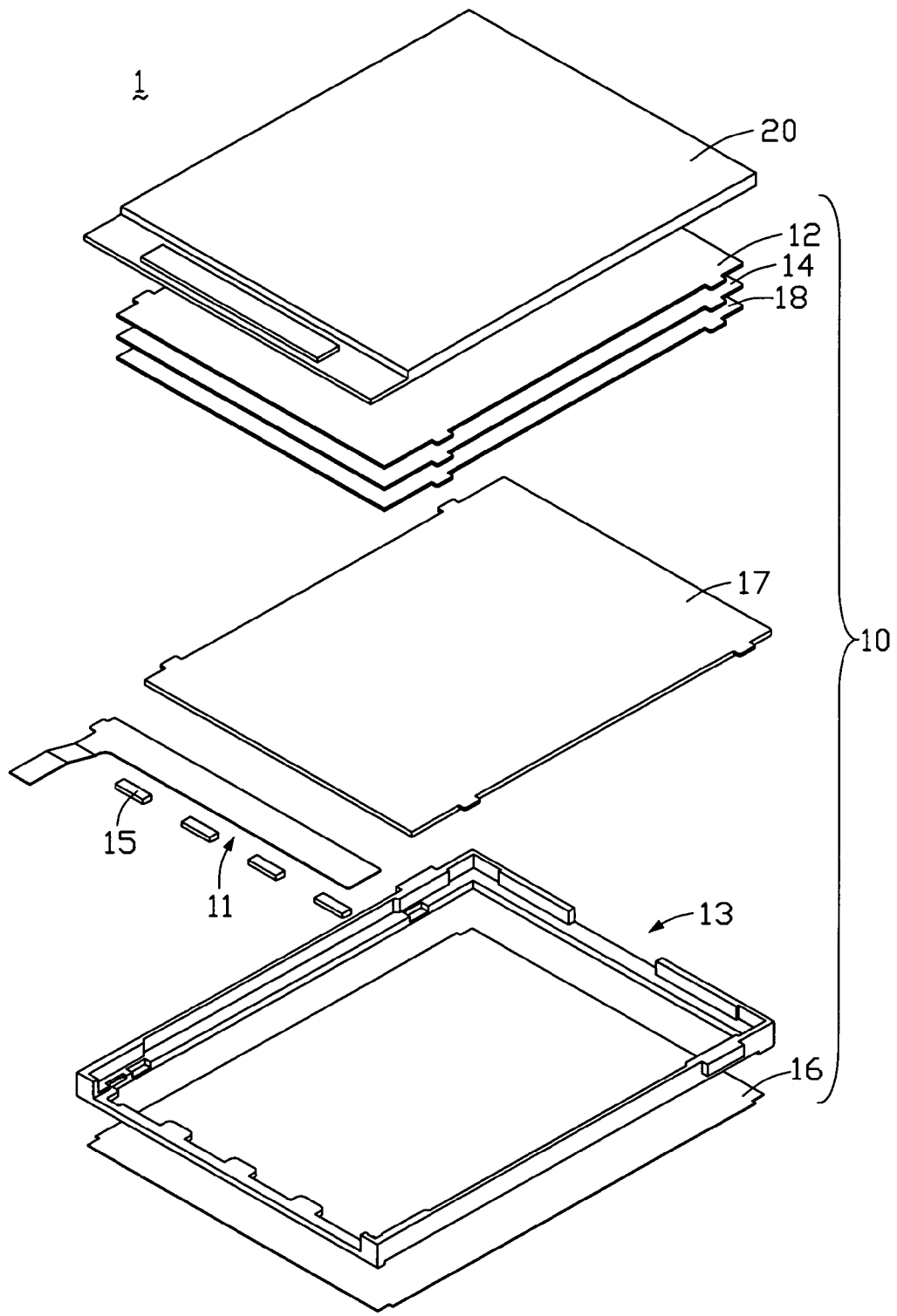
FIG. 6 is an exploded, isometric view of a conventional liquid crystal display.

Referring also to FIGS. 2-4, each elastic connector clip 280 includes a first end 281 generally flush with an outer surface of the corresponding second sidewall 212 or fourth sidewall 214, and an elastic second end 282 protruding slightly into the cutout 2110. The first end 281 and the second end 282 are parallel to each other, and are connected to each other through a bent connection portion (not labeled) of the elastic connector clip 280. A distance between the two second ends 282 of the two elastic connector clips 280 is a little less than a length of the light source 220. Therefore the two second ends 282 of the elastic connector clips 280 can resiliently and tightly press the two metal sheets 222 at the opposite ends of the light source 220, thereby forming good electrical connections therebetween. The first ends 281 of the elastic connector clips 280 are electrically connected to an external power supply (not shown). Thus, the light source 220 is powered by the external power supply.

The liquid crystal display 2 is assembled as follows. The reflective plate 270, the light guide plate 230, the diffusing film 260, the second BEF 250, the first BEF 240, and the liquid crystal panel 100 are positioned in the accommodating space of the frame 210, in that order from bottom to top. The light source 220 is positioned in the cutout 2110 of the frame 210, with the metal sheets 222 respectively pressing against the second ends 282 of the elastic connector clips 280.

Because the liquid crystal display 2 includes the pair of elastic connector clips 280 to elastically fix the light source 220, if the light source 220 needs be renewed, it can be conveniently taken out from the liquid crystal display 2 directly. Thus, the risk of accidental damage to the liquid crystal panel 100 or the optical elements of the backlight module 200 during this process is minimal. Moreover, because the elastic connector clips 280 provide electrical connection between the light source 220 and the external power supply, an FPC is not necessary. Thus, the cost of the liquid crystal display 2 is reduced.

Further or alternative embodiments may include the following. The light source 220 may be a cold cathode fluorescent lamp. The light source 220 may include only one or two LEDs, or more than three LEDs. The metal sheets may be made from metal such as iron, aluminum, or an electrically conductive alloy. The elastic connector clips 280 may be made from metal such as iron, aluminum, or an electrically conductive alloy.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
   a frame comprising two opposite sidewalls and a pair of elastic electrically conductive connector clips, the elastic connector clips being respectively located at the two sidewalls and being opposite to each other, each elastic connector clip comprising a first end substantially flush with an outer surface of a corresponding one of the sidewalls, and a second end protruding from an inner surface of the sidewall;
   a light guide plate disposed in the frame; and
   a light source adjacent to the light guide plate;
   wherein the elastic connector clips cooperatively fix the light source in the frame and are configured for electrically connecting the light source to an external power supply.

2. The backlight module as claimed in claim 1, wherein the light source includes at least one light emitting diode (LED).

3. The backlight module as claimed in claim 1, wherein the light source includes a cold cathode fluorescent lamp (CCFL).

4. The backlight module as claimed in claim 1, wherein the elastic connector clips are made from material including any one or more items selected from the group consisting of iron, copper, aluminum, and an electrically conductive alloy.

5. The backlight module as claimed in claim 1, wherein a distance between the two second ends of the two elastic connector clips is less than a length of the light source, whereby the two second ends resiliently hold the light source therebetween.

6. The backlight module as claimed in claim 5, wherein the light source includes two metal sheets located at two opposite ends thereof respectively, and the metal sheets electrically connect with the second ends of the elastic connector clips, respectively.

7. The backlight module as claimed in claim 6, wherein the metal sheets are made from any one or more items selected from the group consisting of iron, copper, aluminum, and an electrically conductive alloy.

8. The backlight module as claimed in claim 1, wherein the light source is adjacent to an end edge of the light guide plate.

9. A liquid crystal display comprising:
   a liquid crystal panel; and
   a backlight module adjacent the liquid crystal panel for illuminating the liquid crystal panel, the backlight module comprising a frame, a light guide plate disposed in the frame, and a light source adjacent to the light guide plate, the frame comprising two opposite sidewalls and a pair of elastic electrically conductive connector clips, the elastic connector clips being respectively located at the two sidewalls and being opposite to each other, each elastic connector clip comprising a first end substantially flush with an outer surface of a corresponding one of the sidewalls, and a second end protruding from an inner surface of the sidewall;
   wherein the elastic connector clips cooperatively fix the light source in the frame and are configured for electrically connecting the light source to an external power supply.

10. The liquid crystal display as claimed in claim 9, wherein the elastic connector clips are made from material including any one or more items selected from the group consisting of iron, copper, aluminum, and an electrically conductive alloy.

11. The liquid crystal display as claimed in claim 9, wherein the light source includes at least one light emitting diode (LED).

12. The liquid crystal display as claimed in claim 9, wherein the light source includes a cold cathode fluorescent lamp (CCFL).

13. The liquid crystal display as claimed in claim 9, wherein a distance between the two second ends of the two elastic connector clips is less than a length of the light source, whereby the two second ends resiliently hold the light source therebetween.

14. The liquid crystal display as claimed in claim 13, wherein the light source includes two metal sheets located at two opposite ends thereof respectively, and the two metal sheets electrically connect with the second ends of the elastic connector clips, respectively.

15. The liquid crystal display as claimed in claim 14, wherein the metal sheets are made from any one or more items selected from the group consisting of iron, copper, aluminum, and an electrically conductive alloy.

* * * * *

UNITED STATES PATENT AND TRADEMARK OFFICE
CERTIFICATE OF CORRECTION

PATENT NO. : 7,599,019 B2
APPLICATION NO. : 11/500529
DATED : October 6, 2009
INVENTOR(S) : Cheng-Fang Chang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 291 days.

Signed and Sealed this

Twenty-eighth Day of September, 2010

David J. Kappos
*Director of the United States Patent and Trademark Office*